United States Patent
Cheng (10) Patent No.: US 8,352,522 B1
(45) Date of Patent: Jan. 8, 2013

(54) DETECTION OF FILE MODIFICATIONS PERFORMED BY MALICIOUS CODES

(75) Inventor: Yi-Hung Cheng, Taipei (TW)

(73) Assignee: Trend Micro Incorporated, Tokyo (JP)

(*) Notice: Subject to any disclaimer, the term of this patent is extended or adjusted under 35 U.S.C. 154(b) by 93 days.

(21) Appl. No.: 12/873,949

(22) Filed: Sep. 1, 2010

(51) Int. Cl.
*G06F 12/00* (2006.01)
*G06F 11/00* (2006.01)

(52) U.S. Cl. .................. 707/827; 726/22

(58) Field of Classification Search ............ None
See application file for complete search history.

(56) References Cited

U.S. PATENT DOCUMENTS

| | | | |
|---|---|---|---|
| 5,421,006 A | 5/1995 | Jablon et al. | |
| 5,440,723 A | 8/1995 | Arnold et al. | |
| 5,485,575 A | 1/1996 | Chess et al. | |
| 5,613,002 A | 3/1997 | Kephart et al. | |
| 5,630,066 A * | 5/1997 | Gosling | 709/221 |
| 5,948,104 A | 9/1999 | Gluck et al. | |
| 6,029,256 A | 2/2000 | Kouznetsov | |
| 6,035,423 A | 3/2000 | Hodges et al. | |
| 6,052,732 A * | 4/2000 | Gosling | 709/229 |
| 6,073,239 A | 6/2000 | Dotan | |
| 6,108,799 A | 8/2000 | Boulay et al. | |
| 6,175,536 B1 | 1/2001 | Khan | |
| 6,269,456 B1 | 7/2001 | Hodges et al. | |
| 6,347,375 B1 | 2/2002 | Reinert et al. | |
| 6,393,568 B1 | 5/2002 | Ranger et al. | |
| 6,560,632 B1 | 5/2003 | Chess et al. | |
| 6,678,822 B1 | 1/2004 | Morar et al. | |
| 6,772,346 B1 | 8/2004 | Chess et al. | |
| 6,785,820 B1 | 8/2004 | Muttik et al. | |
| 6,952,776 B1 | 10/2005 | Chess | |
| 7,020,895 B2 | 3/2006 | Albrecht | |
| 7,089,589 B2 | 8/2006 | Chefalas et al. | |
| 7,103,913 B2 | 9/2006 | Arnold et al. | |
| 7,210,168 B2 | 4/2007 | Hursey et al. | |
| 7,231,637 B1 | 6/2007 | McEwan | |
| 7,293,177 B2 | 11/2007 | Lahti et al. | |
| 7,356,736 B2 | 4/2008 | Natvig | |
| 7,373,519 B1 * | 5/2008 | Nachenberg et al. | 713/187 |
| 7,496,963 B2 * | 2/2009 | Shipp | 726/24 |
| 7,516,489 B2 | 4/2009 | Lahti | |
| 7,653,612 B1 * | 1/2010 | Veeraswamy et al. | 707/999.001 |
| 7,779,062 B2 * | 8/2010 | Waterson | 709/200 |
| 7,784,098 B1 * | 8/2010 | Fan et al. | 726/25 |
| 7,854,004 B2 * | 12/2010 | van der Made | 726/23 |

(Continued)

OTHER PUBLICATIONS

Portable Executable—Wikipedia, the free encyclopedia; pp. 1-4 [retrieved on Aug. 27, 2010], retrieved from the internet: http://en.wikipedia.org/wiki/Portable_Executable.

(Continued)

*Primary Examiner* — Tarek Chbouki
(74) *Attorney, Agent, or Firm* — Okamaoto & Benedicto LLP (57) ABSTRACT

File modifications performed by malicious codes are detected by detecting a file modification for an original file before the file modification is performed on the original file. In response to detecting the file modification, a corresponding shadow file is created. The shadow file represents the original file as modified by the file modification. Before allowing the file modification to be performed on the original file, the original file is compared to the shadow file to determine if the file modification is being performed by malicious codes. The file modification may be deemed to be performed by malicious codes when the file modification involves, for example, entry point append, entry point prepend, entry point obfuscation, cavity, overwriting, or mal-tattoo.

11 Claims, 5 Drawing Sheets

U.S. PATENT DOCUMENTS

| | | | | |
|---|---|---|---|---|
| 2004/0243829 | A1* | 12/2004 | Jordan | 713/200 |
| 2006/0021054 | A1* | 1/2006 | Costa et al. | 726/25 |
| 2006/0130144 | A1* | 6/2006 | Wernicke | 726/24 |
| 2007/0006314 | A1* | 1/2007 | Costa et al. | 726/25 |
| 2007/0150957 | A1* | 6/2007 | Hartrell et al. | 726/24 |
| 2007/0174351 | A1* | 7/2007 | Liu et al. | 707/201 |
| 2009/0077664 | A1* | 3/2009 | Hsu et al. | 726/24 |

OTHER PUBLICATIONS

X86 Disassembly/Windows Executable Files—Wikibooks, the open-content textbooks collection; pp. 1-16 [retrieved on Aug. 27, 2010], retrieved from the internet: http://en.wikibooks.org/wiki/.../Windows_Executable.

* cited by examiner

DETECTION OF FILE MODIFICATIONS PERFORMED BY MALICIOUS CODES

BACKGROUND OF THE INVENTION

1. Field of the Invention

The present invention relates generally to computer security, and more particularly but not exclusively to methods and apparatus for detecting file modifications performed by malicious codes.

2. Description of the Background Art

Computer viruses, worms, Trojans, rootkits, and spyware are examples of malicious codes that have plagued computer systems throughout the world. Malicious codes have become so prevalent that experienced computer users have some form of antivirus in their computers. Antivirus products for scanning data for malicious codes are commercially available from several vendors, including Trend Micro, Inc.

Conventional antivirus products typically employ some form of signature matching and behavior blocking mechanism to detect files infected by malicious codes. These aforementioned techniques rely on having correct signatures and rules to detect infected files. Unfortunately, signatures for detecting malicious codes may not be available for hours or even days after detection of new malicious codes. Unlike signature matching, behavior blocking does not rely on malicious code signatures. However, behavior blocking has relatively high false alarm rate and may adversely interfere with or even prevent operation of legitimate software.

Once a file is identified as infected, access to and execution of the infected file is blocked by the antivirus. A clean pattern may be created to disinfect the file (i.e., to remove the malicious codes or effects of malicious codes from the file). The clean pattern is typically created manually, and may take some time to create. In the meantime, while the clean pattern is being created by antivirus researchers, the malicious codes that infected the file continue to propagate and infect other files. Worse, the clean pattern may be "buggy" and inadvertently corrupt the infected file or other files, cause a system crash, or force the host computer to keep rebooting.

SUMMARY

In one embodiment, file modifications performed by malicious codes are detected by detecting a file modification for an original file before the file modification is performed on the original file. In response to detecting the file modification, a corresponding shadow file is created. The shadow file represents the original file as modified by the file modification. Before allowing the file modification to be performed on the original file, the original file is compared to the shadow file to determine if the file modification is being performed by malicious codes. The file modification may be deemed to be performed by malicious codes when the file modification involves, for example, entry point append, entry point prepend, entry point obfuscation, cavity, overwriting, or mal-tattoo.

These and other features of the present invention will be readily apparent to persons of ordinary skill in the art upon reading the entirety of this disclosure, which includes the accompanying drawings and claims.

DESCRIPTION OF THE DRAWINGS

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored non-transitory in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. As can be appreciated, software components are executed by a processor to perform computational and other data processing steps. Software components may be implemented in logic circuits, for example. Components may be implemented separately in multiple modules or together in a single module.

Figure 1:
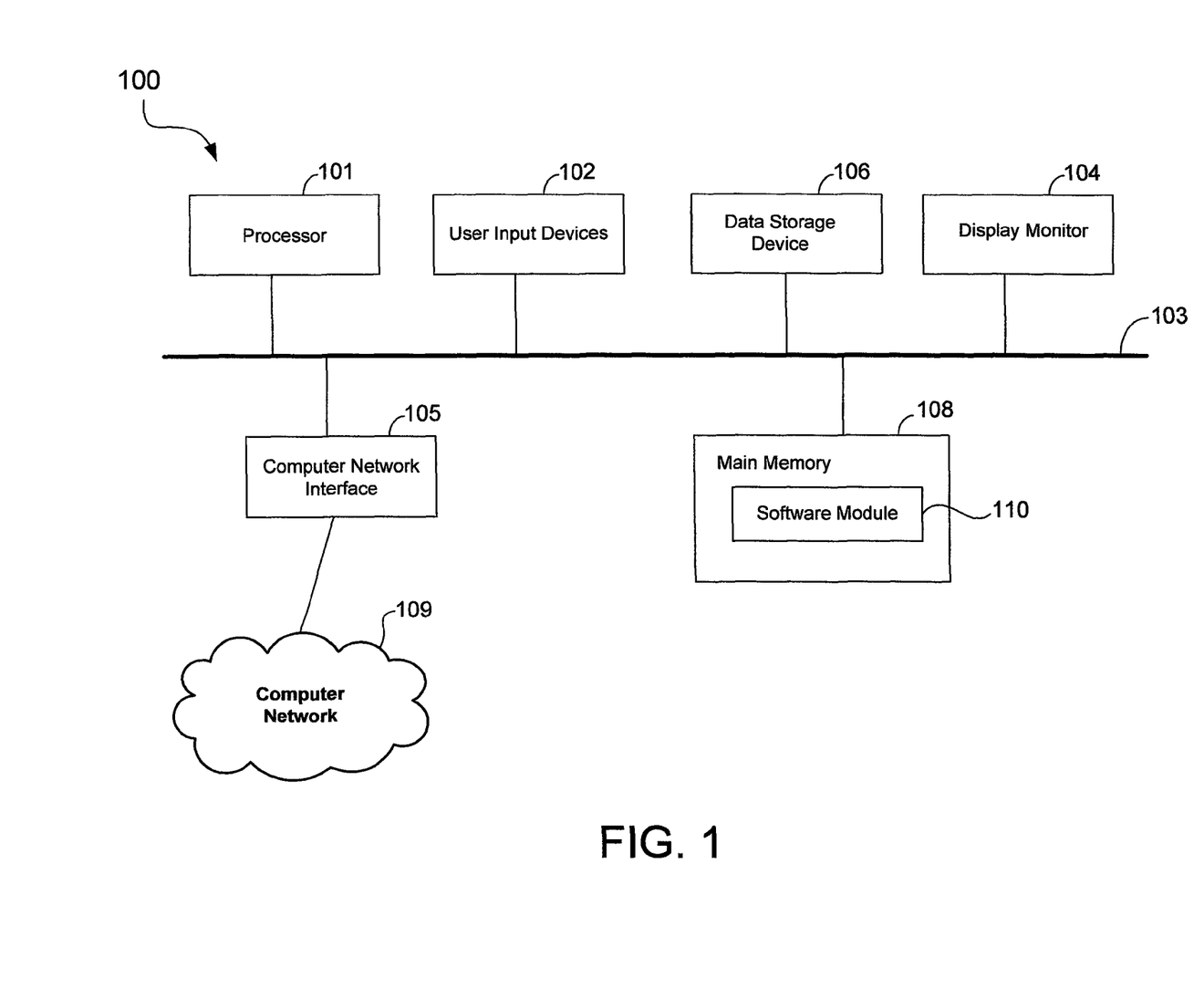
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, the main memory 108 includes software modules 110. The software modules 110 may be loaded from the data storage device 106 to the main memory 108 for execution by the processor 101. The software modules 110 comprise computer-readable program code components of the computer 100, such as a modification decision engine, I/O virtualization engine, application program, operating system, and other components implemented in software.

Figure 2:
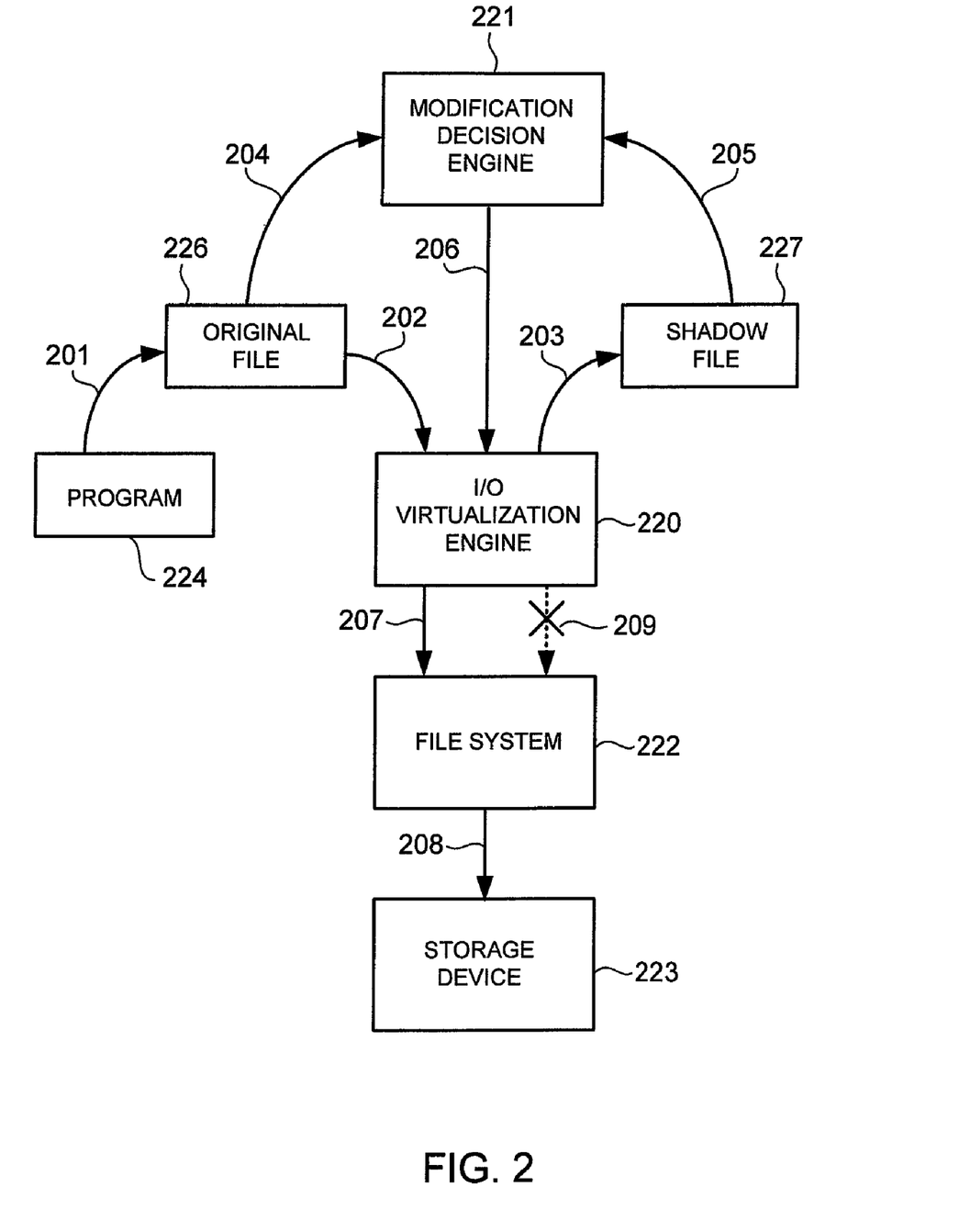
FIG. 2 shows a flow diagram schematically illustrating a method of detecting computer file modifications performed by malicious codes in accordance with an embodiment of the present invention.

FIG. 2 shows a flow diagram schematically illustrating a method of detecting computer file modifications performed by malicious codes in accordance with an embodiment of the present invention.

An I/O virtualization engine 220 may comprise computer-readable program code for intercepting operations to modify (e.g., a File Write) an original file, to create a shadow file of the original file, and to receive information from a modification decision engine 221 on how to respond to the file modification. An I/O virtualization engine 221 may reside in main memory of a host computer and executed by a processor of the host computer. The shadow file is how the original file will be if the file modification is allowed to be performed on the original file. That is, the shadow file represents the modified version of the original file, but not yet committed to be performed on the original file. In one embodiment, the I/O virtualization engine 220 does not create the shadow file until a file modification is attempted on the original file. This advantageously saves processing and storage resources.

The modification decision engine 221 receives the original and shadow files, compares them, and sends information to the I/O virtualization engine 220 based on whether or not the file modification is malicious. The I/O virtualization engine 220 may commit the file modification to replace the original file with the shadow file or discard the shadow file and prevent the file modification from being committed depending on whether or not the modification decision engine 221 deems the file modification to be performed by malicious codes.

The modification decision engine 221 may comprise computer-readable program code for determining whether or not a modification to a computer file is performed by malicious codes, such as a computer virus. The modification decision engine 221 may perform its determination by comparing an entirety of the original file with an entirety of the corresponding shadow file. The modification decision engine 221 performs its determination before the file modification is performed on the original file.

The modification decision engine 221 may reside in main memory of the host computer and executed by the processor of the host computer. The modification decision engine 221, the I/O virtualization engine 220, and file system 222 are shown as separate components for clarity of illustration, but may also be integrated together or with other components. As another example, the modification decision engine 221 and I/O virtualization engine 220 may be implemented as part of a commercially sold antivirus product or a security feature of an operating system.

In one embodiment, the modification decision engine 221 is configured to receive an original file and a shadow file and compare the original file to the shadow file to determine if the original file is being modified by malicious codes. Unlike approaches that only compare certain portions of a file (e.g., only first instruction at program entry point), comparing entire files advantageously allows for a more comprehensive evaluation of the file modification, allowing detection of malicious file modifications that otherwise would go undetected.

When the modification decision engine 221 deems the file modification to be malicious, i.e., performed by malicious codes, the modification decision engine 221 informs the I/O virtualization engine 220 to prevent the file modification from being performed on the original file. Otherwise, when the modification decision engine 221 does not deem the file modification to be malicious, the modification decision engine 221 so informs the I/O virtualization engine 220 to allow the file modification to proceed.

In an example operation, the host computer runs under the Microsoft WINDOWS operating system, and an original file 226 is an executable file that conforms to the Microsoft WINDOWS operating system portable executable file format. A program 224 running in the host computer attempts to modify the original file 226 (arrow 201). The I/O virtualization engine 220 detects the file modification (arrow 202) and, in response after detecting the file modification, creates a corresponding shadow file 227 (arrow 203). The shadow file 227 represents how the original file 226 will look like after the file modification is performed. The file modification is received by the I/O virtualization engine 220 before the file modification is performed on the original file 226, i.e., before the original file 226 is actually modified as stored. The I/O virtualization engine 221 may detect the file modification by interception, from the operating system, inter-process communication with drivers or other software, or other means.

The I/O virtualization engine 220 may inform the modification decision engine 221 of the file modification before the file modification is performed on the original file 226. In response to being informed of the file modification, the modification decision engine 221 compares the original file 226 to the shadow file 227 (arrows 204 and 205) to determine whether or not the file modification is performed by malicious codes. In the case where the program 224 is a legitimate (i.e., not malicious) program, the modification decision engine 221 informs the I/O virtualization engine 220 (arrow 206) to allow the file modification to be committed to the file system 222 (arrow 207) and modify the original file in the storage device 223 (arrow 208). Otherwise, if the program 224 comprises malicious codes, such as a computer virus, the modification decision engine informs the I/O virtualization engine 220 to prevent the file modification from being committed to the file system 222 (symbolized by a broken arrow 209). Unlike other techniques that detect malicious codes in and perform a cleaning of an infected file, the modification decision engine 221 prevents the infection from occurring in the first place.

FIGS. 3-8 schematically illustrate how the modification decision engine 221 may detect file modifications performed by malicious codes in accordance with embodiments of the present invention. In the example of FIGS. 3-8, "View 1" schematically illustrates an executable original file, and "View 2" schematically illustrates the structure of the corresponding shadow file. That is, View 1 shows the original file and View 2 shows the original file after the file modification. As can be appreciated, the file modification is not committed until the original file is modified in storage, which may be virtual or physical. In the Microsoft WINDOWS operating system, for example, the file modification is not performed on the original file as stored in a virtual or physical storage device until the file modification is committed to the file system.

To determine whether or not a file modification is being performed by malicious codes, the modification decision engine 221 may compare the original file (View 1) with the shadow file (View 2) as follows.

Figure 3:
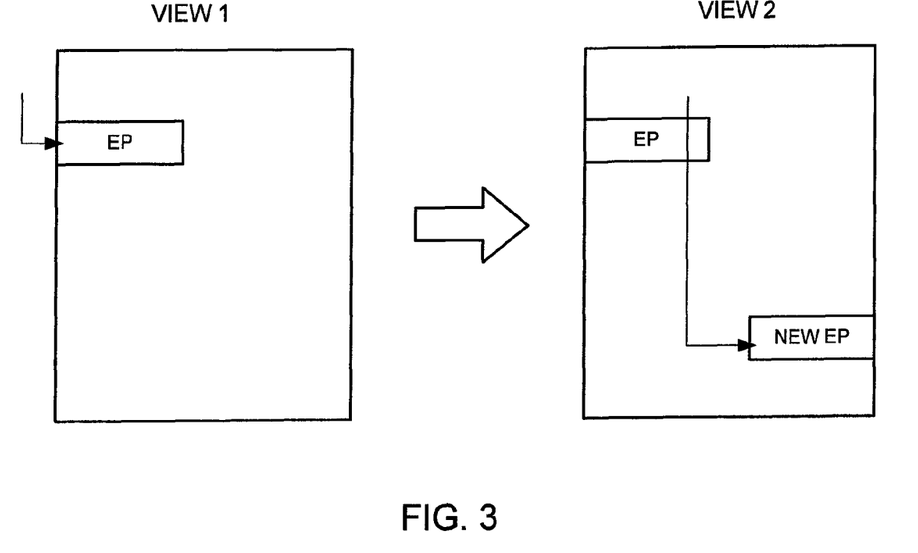
FIGS. 3-8 schematically illustrate how a modification decision engine may detect file modifications performed by malicious codes in accordance with embodiments of the present invention.

Malicious codes may modify an executable file by changing its program entry point. An entry point is a location where the operating system starts running instructions of the executable file. Malicious codes may modify the entry point address in order to add malicious entry point instructions. In the example of FIG. 3, instructions from the program entry point ("EP") of the original file (see FIG. 3, View 1) exist in the shadow file (see FIG. 3, View 2). This is symbolized by the presence of EP in both View 1 and View 2 of FIG. 3. However, the shadow file defines a new program entry point ("NEW EP"), which is in a later file location relative to the original entry point. In other words, the modification appends a new entry point after the original entry point. The shadow file still includes the instructions from the program entry point in the original file, but these instructions are no longer the start point from where the operating system runs the shadow file. This is because the shadow file defines a new entry point for program execution. The modification decision engine 221 deems the just-explained file modification to be performed by malicious codes.

Figure 4:
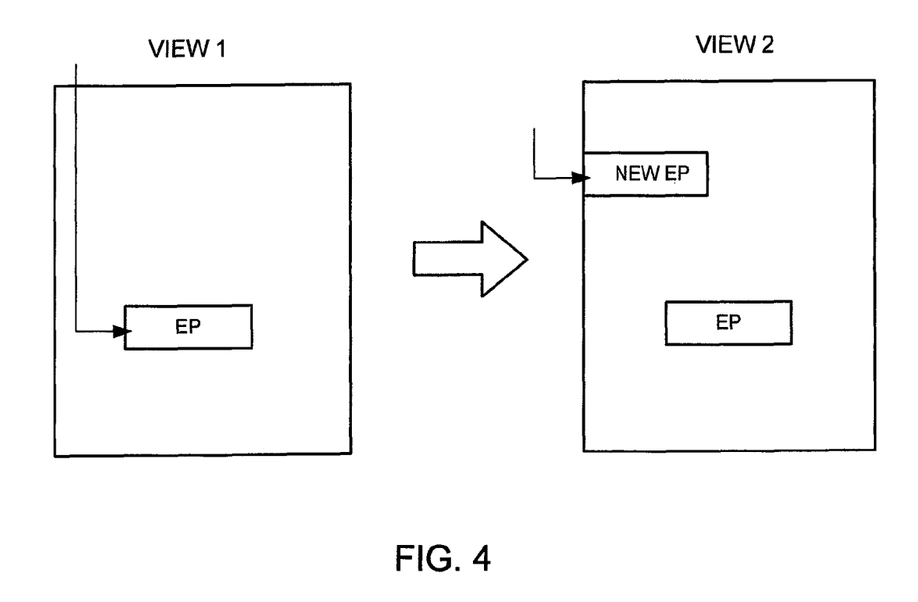

Another way for malicious codes to change the program entry point is by prepending a new entry point before the original entry point. In the example of FIG. 4, instructions from the entry point of the original file (see FIG. 4, View 1) exist in the shadow file (see FIG. 4, View 2). This is symbolized by the presence of EP in both View 1 and View 2 of FIG. 4. However, the shadow file defines a new entry point, which is in an earlier file location relative to the original entry point. This is symbolized by the NEW EP appearing in an earlier file location relative to EP in View 2 of FIG. 4. In other words, the modification prepends a new entry point before the original entry point. The shadow file still includes the instructions from the program entry point in the original file, but these instructions are no longer the start point from where the operating system runs the shadow file. This is because the shadow file defines a new entry point for program execution. The modification decision engine 221 deems the just-explained file modification to be performed by malicious codes.

Figure 5:
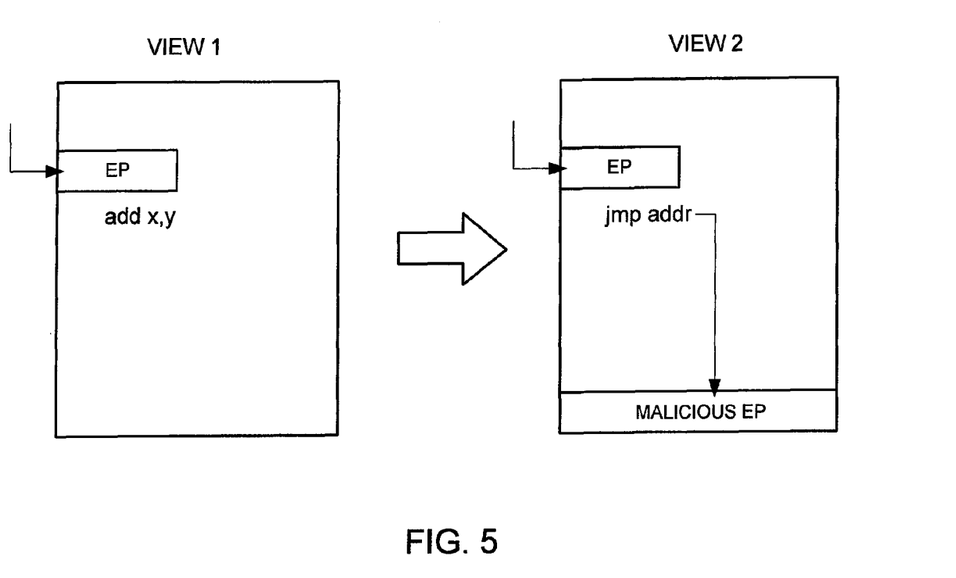

Malicious codes may also modify an executable file to obfuscate the program entry point. Entry point obfuscation may involve modifying the file to include new jump, call, or sequence of push/return instructions around the entry point. The new instructions may be before, after, or both before and after the entry point. In the example of FIG. 5, the instructions from the entry point in the original file (see FIG. 5, View 1) are followed by an arithmetic (e.g., add x,y) instruction. The shadow file, however, still includes the instructions from the original entry point but are now followed by a new instruction that moves program execution to another location, e.g., jump addr instruction, corresponding to the entry point of malicious codes (Malicious EP) (see FIG. 5, View 2).

To detect entry point obfuscation, the modification decision engine 221 may scan the entire section of the shadow file that has the entry point and look for any new instruction that moves program execution to another location (e.g., jump, call, or sequence of push/return instructions). The modification decision engine 221 may determine the destination address of the new instructions to see if the destination address also exists in the original file. If the destination address of the new instruction is not in the original file, the modification decision engine 221 may deem the file modification to be malicious. Otherwise, if the destination address of the new instruction is in the original file, the modification decision engine 221 then compares the contents of the destination address in both the original and shadow files and deems the modification to be malicious when the destination address has different contents in the shadow file compared to the original file.

Figure 6:
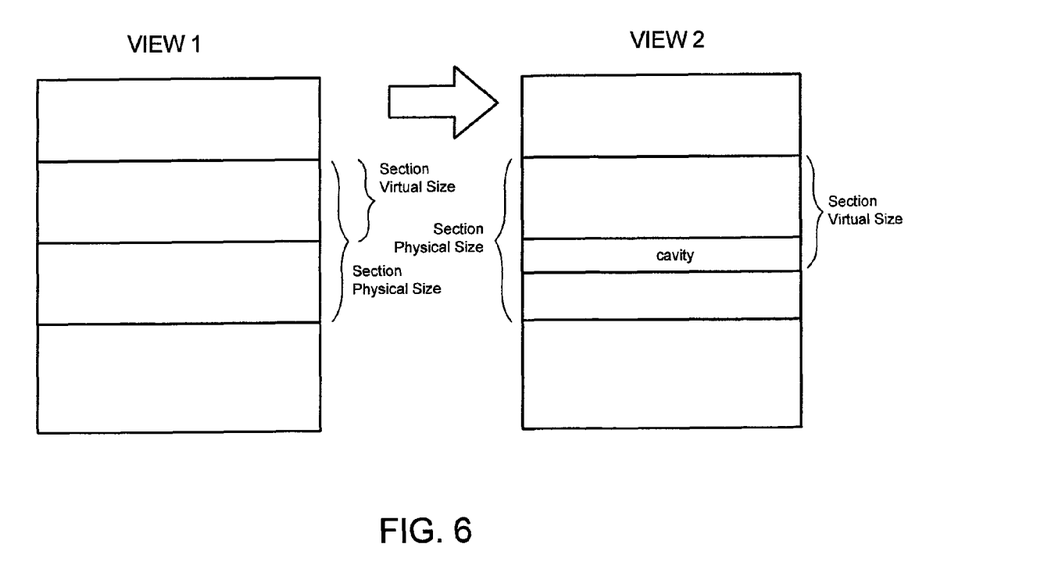
Figure 7:
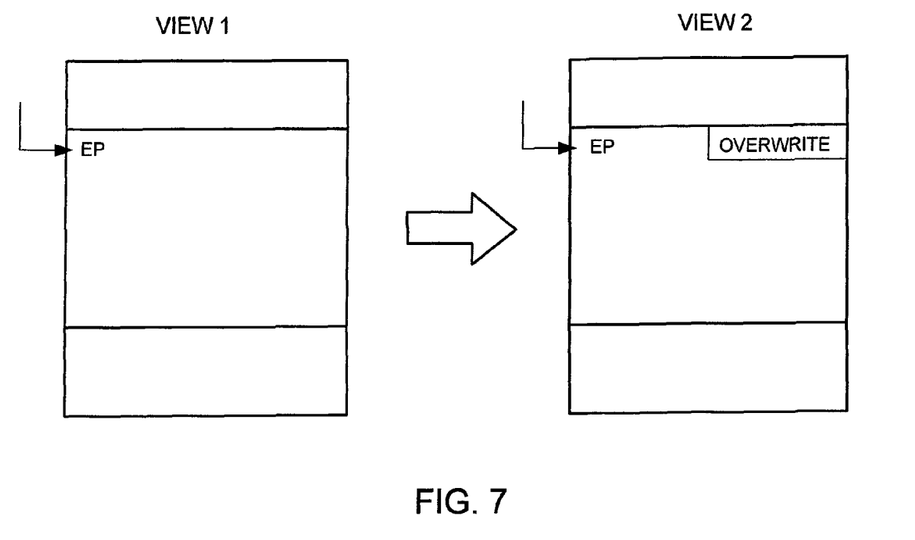

Malicious codes may also modify an executable file to include a cavity. A cavity comprises file blocks that extend from an original section in the original file and increases that section's virtual size in the shadow file. A file that conforms to the Microsoft WINDOWS operating system portable executable format has a physical size corresponding to the file's size as stored in physical data storage (e.g., disk) and a virtual size corresponding to the file's size as loaded in virtual memory of the operating system. In a malicious file modification involving a cavity, the virtual size of a file's section is extended and increased in the shadow file. In the example of FIG. 6, the original file includes a section with a particular virtual size and a particular physical size (see FIG. 6, View 1). In the shadow file, however, the section's virtual size is larger compared to that section's virtual size in the original file (see FIG. 6, View 2). The cavity comprises the extra file blocks in the shadow file that extend the section in virtual memory and increases the section's virtual size. While this is usually the case, it is to be noted that if a file section's virtual size is large enough, malicious codes may not need to increase the section's virtual size. The modification decision engine 221 deems file modifications that create a cavity to be performed by malicious codes.

Malicious codes may modify an executable file to overwrite portions of the file. Malicious codes may modify file blocks to have particular modification patterns in comparison to the original file, or have co-existing old properties/tables and new properties/tables that serve the same purpose in the shadow file. In the example FIG. 7, instructions from entry point of the original file (see FIG. 7, View 1) have been overwritten with new data in the shadow file (see FIG. 7, View 2). The file blocks that have been overwritten in the shadow file may include particular modification patterns indicative of modifications performed by malicious codes. The overwritten file blocks may also include new properties or tables that serve the same purpose as properties or tables that exist in both the original and shadow files. The modification decision engine 221 deems the just-explained modification to be performed by malicious codes.

Figure 8:
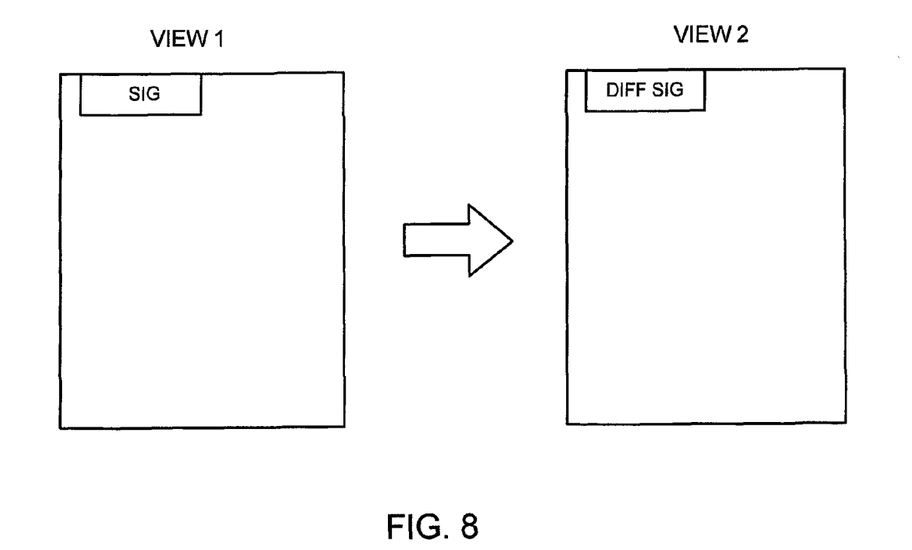

Malicious codes may also modify an executable file by modifying file blocks to include inconsistent data/tables that were not present in the original file. This malicious file modification is referred to as Mal-Tattoo. Examples of inconsistent data/tables include inconsistent Microsoft WINDOWS operating system Portable Executable (PE) 4-byte signature, import table, and so on. In the example of FIG. 8, the PE 4-byte signature (SIG) in the original file (see FIG. 8, View 1) has been changed to a different PE 4-byte signature (DIFF SIG) in the shadow file (see FIG. 8, View 2). The PE 4-byte signature may be the checksum of the original file. The change in the PE 4-byte signature is inconsistent in this example because the original file has a non-zero checksum whereas the shadow file has a zero checksum.

The modification decision engine 221 may also check the import table of the shadow file and original file for consistency. In one embodiment, the modification decision engine 221 checks the import table of the shadow file to determine the application programming interface (API) or other function that the shadow file is importing. If the import table of the shadow file indicates that it is not importing any API that is the same as an API imported in the original file, the modification decision engine 221 may deem the modification to be malicious because it is rare for a legitimate program to modify an original file with completely new imported APIs. In contrast, malicious codes typically overwrite the entire import table of the original file with completely new APIs. Otherwise, if the import table of the shadow file indicates that it is importing at least one API that is also imported in the original file, the modification decision engine 221 may deem the modification to be legitimate (i.e., not malicious).

By comparing the original file to the shadow file, the modification decision engine 221 may look for the above-described modifications, i.e., entry point append, entry point prepend, entry point obfuscation, cavity, overwrite, and mal-tattoo, to detect malicious file modification.

Techniques for detecting file modifications performed by malicious codes have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting file modifications performed by malicious codes, the method to be performed by a computer and comprising:

detecting a file modification for an original file in a file system before the file modification is performed on the original file in the file system;

in response to detecting the file modification, creating a shadow file of the original file before the file modification is performed on the original file in the file system, the shadow file representing the original file as modified with the file modification and how the original file will be if the file modification is allowed to be performed on the original file;

before allowing the file modification to be performed on the original file in the file system, comparing the original file to the shadow file to determine if the file modification is being performed by malicious codes;

deeming the file modification to be performed by malicious codes when instructions from an original entry point of the original file are still present in the shadow file but the shadow file indicates a new entry point for the shadow file; and preventing the file modification from being committed to the file system when the file modification is deemed to be performed by malicious codes.

2. The method of claim 1 wherein the new entry point is appended after the original entry point in a later file location relative to the original entry point.

3. The method of claim 1 were in the new entry point is prepended before the original entry point in an earlier file location relative to the original entry point.

4. The method of claim 1 wherein the original file is in portable executable format.

5. The method of claim 1 wherein the file modification is committed to the original file in the file system of the computer when the file modification is not deemed to be performed by malicious codes.

6. The method of claim 1 wherein the malicious codes comprise a computer virus.

7. A method of detecting file modifications performed by malicious codes, the method to be performed by a computer and comprising:

detecting a file modification for an original file in a file system before the file modification is performed on the original file in the file system;

in response to detecting the file modification, creating a shadow file of the original file before the modification is performed on the original file in the file system, the shadow file representing the original file as modified with the file modification and how the original file will be if the file modification is allowed to be performed on the original file;

before allowing the file modification to be performed on the original file in the file system, comparing the original file to the shadow file to determine if the file modification is being performed by malicious codes;

deeming the file modification to be performed by malicious codes when the shadow file includes a new instruction around an entry point that exists in both the shadow file and the original file, the new instruction being for moving program execution to another location and not being present around the entry point in the original file; and preventing the file modification from being committed to the file system when the file modification is deemed to be performed by malicious codes.

8. The method of claim 7 wherein the original file is in portable executable format.

9. The method of claim 7 wherein the malicious codes comprise a computer virus.

10. A method of detecting file modifications performed by malicious codes, the method to be performed by a computer and comprising:

detecting a file modification for an original file in a file system before the file modification is performed on the original file in the file system;

in response to detecting the file modification, creating a shadow file of the original file before the file modification is performed on the original file in the file system, the shadow file representing the original file as modified with the file modification and how the original file will be if the file modification is allowed to be performed on the original file;

before allowing the file modification to be performed on the original file in the file system, comparing the original file to the shadow file to determine if the file modification is being performed by malicious codes;

deeming the file modification to be performed by malicious codes when a virtual size of a section of file blocks in the shadow file is extended and increased in the shadow file compared to the section of the file blocks in the original file; and preventing the file modification from being committed to the file system when the file modification is deemed to be performed by malicious codes.

11. The method of claim 10 wherein the malicious codes comprise a computer virus.

* * * * *